I. W. Bragg,
Carpet-Stretcher,

N° 22,930. Patented Feb. 15, 1859.

Witnesses:

Inventor:
Isaac W. Bragg

UNITED STATES PATENT OFFICE.

ISAAC W. BRAGG, OF CINCINNATI, OHIO.

CARPET-STRETCHER.

Specification of Letters Patent No. 22,930, dated February 15, 1859.

*To all whom it may concern:*

Be it known that I, ISAAC W. BRAGG, of the city of Cincinnati, county of Hamilton, State of Ohio, have invented a new and useful Carpet-Stretcher; and I do hereby declare the following to be a full, clear, and exact description thereof, reference being had to the annexed drawings, making part of this specification.

This invention relates to a device adapted for attachment at the side of the room toward which the carpet is to be stretched.

Figure 2:
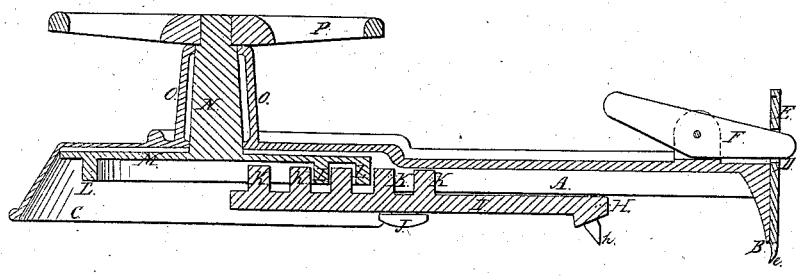
Figure 1:
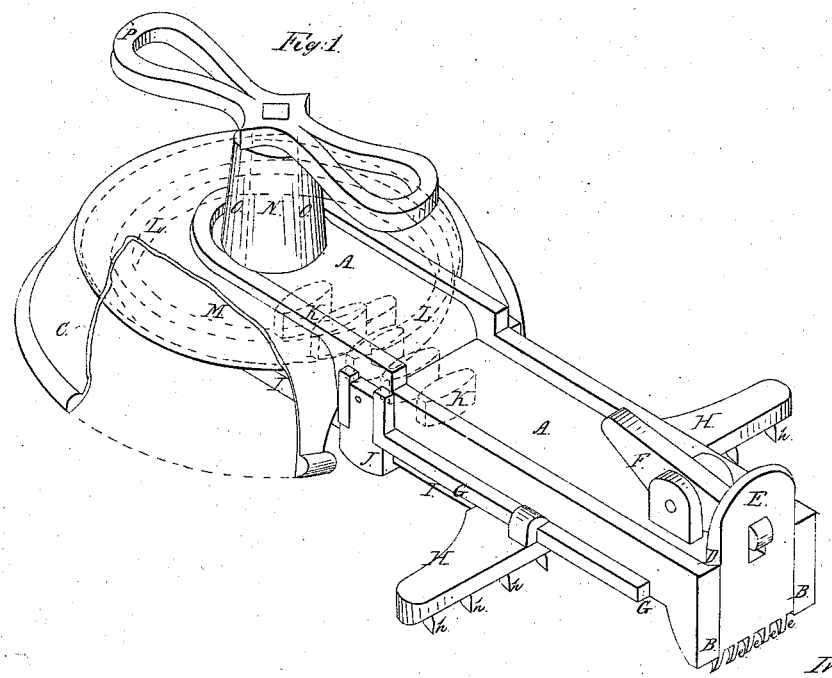

In the accompanying drawings Figure 1, is a perspective view. Fig. 2, is a longitudinal section.

A is a suitable casting constituting the stock or frame of the instrument supported at one end on feet B, and at the other end on a circular apron or flange C. One end of this frame has a vertical dovetailed mortise D, to hold and guide a steel plate E, armed with teeth (e) which incline slightly inward. This toothed plate (which I call the "dog E e") is intended to attach the instrument to the floor of the room immediately adjacent to the wall toward which the carpet is to be stretched.

F, is a trip lever for the detachment of the dog.

G, is one of two similar slides for the support and guidance of the rake H, whose shank I is supported in a staple J, projecting from the frame. The teeth h of the rake H, present downward and forward and are by means of the slides, flange and feet prevented from grazing the floor. The upper part of the shank I, has a rack K, to receive a worm or spiral flange L, upon a disk M, whose shaft N, being journaled in a suitable hub O, is surmounted with a handle P. The rake H, with its shank I, and rack K, I call the "driver." The disk M and its appendages I call the "worm" L, M, N, P.

Operation: The "driver" being drawn back and its teeth inserted in the unfastened edge of the carpet the whole is then pulled forward until the "dog" E, e, being in contact with the surbase is made fast in the floor by striking its upper edge with a hammer. The "driver" H, I, K, is forced forward (by rotating the worm) until the edge of the carpet reaching the wall is secured to the floor by being tacked down. A tap then given to the counter arm E, releases the dog from the floor and the process is repeated at another part of the carpet.

This instrument is complete in itself and does not require for its operation any staff or other abutment. The action of the worm L, is such as to hold the "driver" firmly at any position to which it may be advanced without the necessity of any pawls or other special detaining mechanism.

I claim as new and of my invention herein—

1. The dog E, e, operating substantially as described to attach the stretcher to that part of the floor next the wall toward which the carpet is to be stretched.

2. The combination and arrangement of the trip lever F, for disengaging the dog as set forth.

3. The combination and arrangement of the apron C, feet B, and slides G, operating substantially as described in combination with the rake H, to prevent the teeth h, from grazing the floor.

4. The combination and arrangement substantially as set forth of the stock A, dog E, e, driver H, I, K, and actuating worm M, operating in the manner and for the purpose explained.

In testimony of which invention, I hereunto set my hand.

ISAAC W. BRAGG.

Witnesses:
 GEO. H. KNIGHT,
 THOMAS KILE.